Patented Nov. 22, 1949

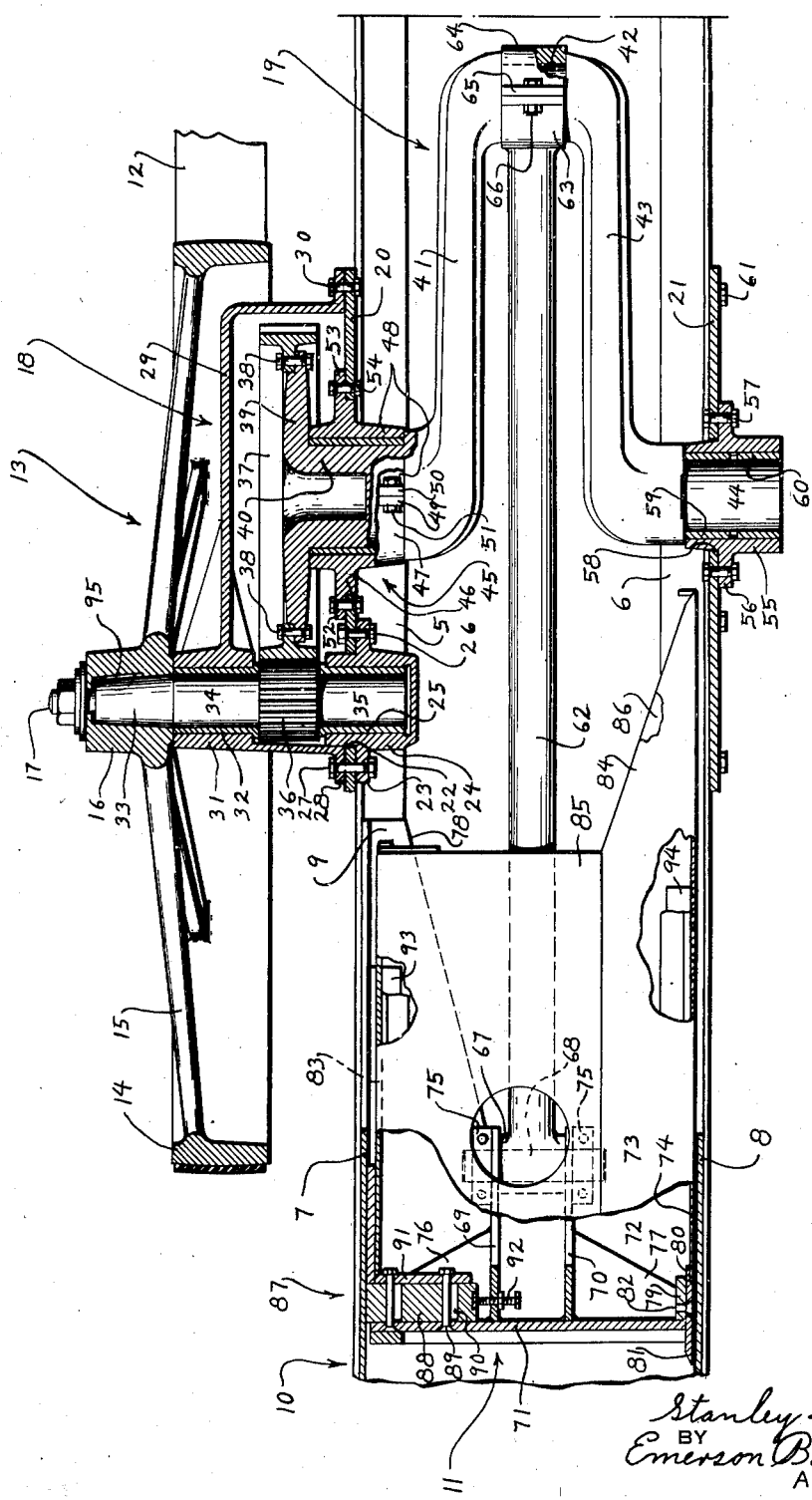

2,489,198

UNITED STATES PATENT OFFICE 2,489,198

BALER AND REDUCTION GEAR THEREFOR

Stanley D. Russell, Racine, Wis., assignor to J. I. Case Company, Racine, Wis., a corporation Original application April 19, 1941, Serial No. 389,396, now Patent No. 2,362,861, dated November 14, 1944. Divided and this application November 11, 1944, Serial No. 563,039

6 Claims. (Cl. 100—3)

The present invention relates to balers and an object thereof is to generally improve the construction and operation of machines of this class.

A further object is to provide such a machine of larger capacity, lighter weight and lower cost than similar machines of comparable dimensions heretofore known. A further object is to provide improved gear reduction means for a baler. Further objects will be apparent from the following description and accompanying drawing which shows a plan view of a portion of a baling mechanism sufficient to illustrate the invention, the mechanism being in part in horizontal section on the axis of the main actuating shafts, similar reference characters having been applied to the same parts throughout this drawing and the specification. The machine of the present invention is generally similar to that shown and described in co-pending Patent No. 2,362,861, issued November 14, 1944 of which this application is a division.

As seen in the drawing, the illustrative machine includes a baler including a baling chamber made up in any suitable and well-known manner as for example from angle irons 5 and 6 to which are connected side plates 7 and 8 and a bottom plate 9, it being understood that other angle irons and a top plate, not shown, complete a box-like inclosure generally designated as 10 in the manner fully disclosed in the above identified co-pending Patent No. 2,362,861. The several angle irons and plates constitute the foundation for the reduction gear to be described and form a chamber for reciprocation of a plunger generally designated as 11.

The mechanism is driven in the first instance from any suitable prime mover, not shown, by means of a belt 12 engaging a flywheel generally designated as 13 and having a rim portion 14, spokes or arms 15 and a hub 16. Flywheel 13 is fixed on a shaft 17 through which it drives baling plunger 11 as will appear.

Shaft 17 constitutes the main input shaft of the above referred to reduction gear designated as a whole by numeral 18 for driving a crank shaft generally designated as 19. A plate or housing portion 20 is suitably fixed with angle iron 5 for supporting shafts 17 and 19 and a plate 21 is suitably fixed with angle iron 6 for further supporting crank shaft 19, these plates supporting the parts against the very considerable stresses developed by a baling operation. Plate 20 has an aperture 22 in which is secured by a flange 23 a bearing 24 which may be fitted with a bushing 25 or other friction reducing element.

Bearing 24 is secured in place by one or more bolts as 26 and 27, bolt 27 engaging a flange portion 28 of a housing 29 which abuts plate 20, a suitable gasket being interposed if desired. Other bolts as 30 serve to maintain the housing solidly in place. Housing 29 includes a boss or bearing portion 31 provided with a bushing 32 or other suitable friction reducing means. Shaft 17 is therefore journaled in bushings 25 and 32 and accordingly well supported for rotation in housing 29.

Shaft 17 includes a portion 33 which may be tapered or otherwise adapted for flywheel hub 16, and journaled portions 34 and 35 for support in the respective bearings, journals 34 and 35 being spaced by a gear or pinion 36. Pinion 36 in the present instance meshes with and drives a ring gear 37 within housing 29, gear 37 being fixed as by bolts 38—38 with a flange or adapter 39 forming part of above mentioned crank shaft 19. Crank shaft 19 includes said flange or adapter 39, a journal portion 40, a crank arm 41, a crank pin portion 42, a crank arm 43 and a journal portion 44. Journal portion 40 is carried in a bearing generally designated as 45 and fixed in an aperture 46 in above mentioned plate 20. However, in order to be able to assemble the parts, bearing 45 comprises separable sections 47 and 48 joined as by flanges 49 and 50, united by suitable bolts or the like 51. Portions 47 and 48 are provided with flanges as 52 and 53 fixed with plate 20 as by bolts 54.

With the structure described, it is possible with housing 29 removed from plate 20 to pass journal portion 44, arm 43, pin 42, arm 41 and bearing 45 through aperture 46 into place in plate 20, after which housing 29 may be applied and shaft 17 and bearing 24 assembled with the housing. These associated parts constitute a reduction gear which may operate in a bath of oil retained by housing 29, the housing also serving to exclude dirt or other deleterious material from the gear. Incidentally, ring gear 37 may be chosen from production items manufactured in quantity for other purposes, such for example as tractor main drive gears, this resulting in the availability for a relatively inexpensive machine, such as a baler, of a very high quality gear. Pinion 36 may be readily and inexpensively cut on shaft 17 by well-known methods.

In view of this construction, it will be evident that a crank can be used having a throw considerably in access of the diameter of gear 37 which is not the case in conventional construction wherein two large gears connected by a pin constitute the crank. As a result, the necessary long stroke is obtained in the present device with much smaller and lighter construction than has heretofore been known. Also by virtue of this construction, the gear may be readily inclosed in an oil-tight casing with well-known advantages in cleanliness, durability and freedom from excessive wear and noise.

Journal 44 in the present instance is supported in a bearing 55 secured to plate 21 as by a flange 56 and bolts 57. Bearing 55, in the present instance, is arranged to extend through an aperture 58 in plate 21 and may have bushings 59 and 60 or other suitable friction reducing elements. Plate 21 is secured to angle iron 6 in any suitable manner as by bolts 61.

Crank pin portion 42 carries and actuates a pitman 62 having a bearing portion 63 in the present instance fitting with a cap 64 maintained against the bearing as by a flange 65 secured by one or more bolts 66. Pitman 62 at its opposite end has a bearing 67 engaged with a wrist pin 68 carried in brackets 69 and 70 fixed with or constituting part of plunger 11. Rotation of crank 41 accordingly will cause reciprocating motion of plunger 11 as will be apparent.

Plunger 11 comprises a box-like element including a head or end wall 71, a bottom wall 72, a top wall 73 and a side wall 74. Brackets 69 and 70 are fastened as by welding within wall 71 and have split clamps 75 suitably fastened thereto for holding wrist pin 68. Reinforcing plates 76 and 77 are interposed between brackets 69 and 70 and end wall 71. The very considerable force developed by pitman 62 is accordingly transmitted directly to end wall 71 in the best possible manner.

Lower plate 9 of baling chamber 10 is notched as at 78 to provide clearance for pitman 62.

At the juncture between end wall 71 and side wall 74, reinforcing bars or plates 79 and 80 are interposed and fastened in any suitable manner and a knife or cutting means 81 is mounted on the plunger at this point and retained as for example by screws 82. Reinforcing bars 79 and 80 serve to support the plunger against distortion by reaction against knife 81.

To hold plunger 11 in proper relation to baling chamber 10, plunger 11 has a side wall 83, walls 83 and 74 being of substantial length, but side wall 74 extends forwardly of plunger 11 substantially further than wall 83 for covering a feed opening in a manner fully set forth in the above mentioned co-pending Patent No. 2,362,861. Wall 74 is reinforced by an extension 84 of an upper wall 85, a similar lower extension 86 serving also to support wall 74. Wall 74 is held in suitable sliding relation to angle iron 6 by pressure exerting guiding means generally designated as 87 and which in the present instance comprises a block 88 of suitable material such as oil impregnated wood. In the present instance, block 88 is held in contact with end wall 71 by bolts 89 traversing slotted openings 90 and engaging a plate 91 through which block 88 is clamped in engagement with end wall 71. Block 88 is urged by a screw 92, threaded into bracket 69, through a suitable opening in side wall 83 into contact with plate 7, the reaction of block 88 maintaining wall 74 in position relative to plate 8 and also maintaining knife 81 in proper relation to its companion abutment means not shown. A similar guiding means is preferably provided adjacent the front end of plunger 11. In each instance the block is preferably arranged with the end grain in contact with the guiding surface.

Plunger 11 is supported for sliding movement and guided generally in its reciprocations in chamber 10 by suitable or well-known manner such for example as sliding blocks 93 and 94, while close adjustment of the path of travel may be effected by adjusting block 88.

In the event that plunger 11 encounters a solid object of any kind, a safety expedient is provided in that portion 33 of shaft 17, provided with a key 95 through which it is driven by hub 16 of flywheel 13. In the present instance key 95 is made of a soft material such for example as an aluminum alloy, the proportions being so chosen that the key will shear if anything obstructs the progress of plunger 11 and the loads build up to a predetermined maximum. It is a simple matter to renew the soft metal key and continue operation after the obstruction is removed.

The above being a complete description of an illustrative embodiment of the invention, what is claimed as new and desired to be secured by Letters Patent of the United States is:

1. In a driving train for a baler having a baling chamber and a plunger, an oiltight casing supported on the baling chamber, a driving shaft journaled in the casing, a driven shaft journaled in the casing and having a crank externally of the casing having a throw in excess of the size of said casing and being connected for actuating the plunger, said driven shaft being enlarged to the form of a flange located within the casing, a ring gear fixed with the flange, and a gear on the driving shaft within the casing in driving engagement with the ring gear.

2. In a driving train for a baler having a baling chamber and a plunger reciprocable in the chamber, a casing mounted on the baling chamber, a driving shaft journaled in the casing, a driven shaft journaled in the casing and having a crank externally of the casing and connected for actuating the plunger, said driven shaft being enlarged to form an integral flange on the driven shaft located within the casing, a ring gear fixed with the flange, and a gear on the driving shaft within the casing in driving engagement with the ring gear.

3. In a driving gear for a baler having a baling chamber and a plunger slidable therein, a drive shaft and a driven shaft, a gear on one of said shafts, a bearing plate carried by the baling chamber and disposed for supporting said shafts, one of said shafts having a flange, a crank throw spaced from the flange and connected for sliding said plunger and a journal portion interposed between said crank throw and said flange, a separable bearing engaged with the journal portion and supported from said plate, a ring gear separate from said flange and fixed therewith in driving relation with the first mentioned gear, and a housing fixed with said plate enclosing said gears.

4. In a baler, including a baling chamber, the combination of a housing portion secured to one side of the baling chamber, and providing an aperture for the reception of a crank shaft, a crank shaft supported in the housing portion, a separable bearing interposed between the housing portion and the crank shaft and supporting the latter from the housing portion, a flange permanently united with the crank shaft and disposed on one side of the housing portion and said crank shaft having a crank throw on the other side of the housing portion, said crank throw being of a size substantially greater than the diameter of said flange, a ring gear on the flange of a diameter less than the path described by said crank throw, a second housing portion engaged with the first mentioned housing portion and forming therewith a closure for the flange and gear, and pinion means in the closure housing engaging the ring gear for actuating the crank shaft.

5. In a driving gear for a baler having a baling chamber, and a plunger slidable in the chamber, an apertured housing portion carried on one side of the baling chamber, a driving shaft supported for rotation in said housing portion, a driving gear on said shaft, a crank shaft having a throw portion, an integral journal and an integral driving flange spaced from the throw portion by the journal, separable bearing means engaged about said journal portion and adapted to be received in the aperture of said housing portion, a ring gear separate from said flange and fixed thereon in driven relation with said driving gear, a second housing portion fixed with the first mentioned housing portion and enclosing said gears, and a pitman connected with said throw portion, said pitman being connected in driving relation with said plunger.

6. In a driving gear for a baler having a baling chamber and a plunger slidable therein, a driving shaft and a driven shaft, a crank throw on the driven shaft connected for sliding the plunger, a gear on said driving shaft, said driven shaft being enlarged to form a flange and provided with a journal portion adjacent said flange and integral therewith and serving to space said flange from said crank throw, a ring gear separate from said flange and fixed therewith in driving relation with the first mentioned gear, and separable bearing means engaged with said journal portion in supporting relation therewith.

STANLEY D. RUSSELL.

REFERENCES CITED

The following references are of record in the file of this patent:

UNITED STATES PATENTS

| Number | Name | Date |
| --- | --- | --- |
| 772,929 | Foster | Oct. 25, 1904 |
| 1,104,423 | Huff | July 21, 1914 |
| 1,201,148 | Chittenden | Oct. 10, 1916 |
| 1,438,289 | Barbarou | Dec. 12, 1922 |
| 1,903,914 | Parrett | Apr. 18, 1933 |
| 2,042,242 | Voss | May 26, 1936 |
| 2,126,486 | Malkin | Aug. 9, 1938 |

FOREIGN PATENTS

| Number | Country | Date |
| --- | --- | --- |
| 810,998 | France | Jan. 9, 1937 |